United States Patent [19]

Tsuchiya et al.

[11] 4,252,699
[45] Feb. 24, 1981

[54] NOVEL VARNISH COMPOSITION FOR OFFSET PRINTING INKS

[75] Inventors: Shozo Tsuchiya, Tokyo; Makoto Sasaki; Hideo Hayashi, both of Yokohama, all of Japan

[73] Assignee: Nippon Oil Company, Ltd., Tokyo, Japan

[21] Appl. No.: 109,212

[22] Filed: Jan. 3, 1980

[30] Foreign Application Priority Data

Jan. 8, 1979 [JP] Japan ..................... 54-128

[51] Int. Cl.³ ............... C08L 91/00; C09D 11/06; C09D 11/10
[52] U.S. Cl. ............... 260/19 UA; 260/DIG. 38
[58] Field of Search ............... 260/19 UA, DIG. 38

[56] References Cited

U.S. PATENT DOCUMENTS

| | | | |
|---|---|---|---|
| 3,937,674 | 2/1976 | Laarkamp | 260/19 UA |
| 4,028,291 | 6/1977 | Tsuchiya et al. | 260/DIG. 38 |
| 4,139,500 | 2/1979 | Rudolphy | 260/19 UA |
| 4,169,821 | 10/1979 | Werner et al. | 260/DIG. 38 |

*Primary Examiner*—Allan Lieberman
*Attorney, Agent, or Firm*—Sherman & Shalloway

[57] ABSTRACT

A varnish composition for offset printing inks, said composition comprising

[A] 100 parts by weight of a resin having a softening point of at least 100° C. and an acid value of 5 to 50, said resin being produced by reacting 100 parts by weight of (I) a hydrocarbon resin obtained by polymerizing (a) a 5-membered cyclic compound having a conjugated double bond and expressed by the following general formula

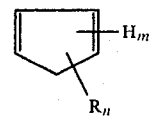

wherein H represents hydrogen, R represents an alkyl group having 1 to 3 carbon atoms, m and n or 0 or an integer of at least 1, and m+n equals 6, and/or its Diels-Alder adduct, with 1 to 15 parts by weight of (b) an unsaturated carboxylic acid and/or its anhydride to form (II) an acid-modified resin, reacting the acid-modified resin (II) with 0.1 to 1.0 molar equivalent based on the acid groups in the acid-modified resin (II), or 0.2 to 2.0 mole equivalents based on the acid anhydride groups in the acid modified resin (II), of (c) a saturated and/or unsaturated monohydric higher alcohol to form (III) an esterified resin, and further reacting 100 parts by weight of the esterified resin (III) with 5 to 100 parts by weight of (d) a phenolic resin derived from formaldehyde and a phenol having an alkyl substituent containing 4 to 9 carbon atoms,

[B] 50 to 200 parts by weight of a hydrocarbon solvent having an aromatic content of not more than 50% by weight and a boiling range of from 200° to 350° C., and

[C] 10 to 100 parts by weight of a drying oil.

8 Claims, No Drawings

NOVEL VARNISH COMPOSITION FOR OFFSET PRINTING INKS

This invention relates to a varnish composition for offset printing inks.

Relief printing, lithographic printing (e.g., offset printing) and gravure printing are presently in widespread use as general printing methods. In the offset printing method, an image coated with an ink is transferred from a printing roll to a rubber blanket from which it is printed on paper. In the printing roll, water is included in a nonimage area (water-retaining part) which does not receive an oily ink, and an image area (ink-adhering part) contains an ink and repels water. An offset printing ink composition is usually produced by adding a pigment to a resin varnish composed of a resin, a solvent, a drying oil such as linseed oil and other additives.

Accordingly, the basic properties required of the resin varnish for offset printing inks are as follows:

(1) An interfacial balance should be maintained between the water-retaining part and the ink-adhering part of a printing press because line images are formed on a flat surface by the contact of water with the ink.

(2) It should have suitable flowability characteristics, such as its viscosity and yield values.

(3) It should have good pigment dispersibility.

(4) It should give printed matter in which the printed surface has good gloss and which is of uniform quality.

(5) It should permit a rapid set time and a rapid drying time and should not cause blocking.

(6) It should give printed matter in which the printed surface has good abrasion resistance.

In order to meet these requirements of resin varnishes, the resin used should have the following properties.

(1) It should have sufficient solubility in high-boiling hydrocarbon solvents with a low aromatic content which are used in offset printing inks.

(2) It should have sufficient solubility in drying oils such as linseed oil.

(3) It should have a high softening point but should not have a high molecular weight.

(4) It should have a polar group having good affinity with a pigment.

Resin varnishes obtained by dissolving alkylphenol resins, rosin-modified phenolic resins, maleic acid resins, etc. in drying oils such as linseed oil are now used as varnishes for printing inks, and the rosin-modified phenolic resins currently gain most widespread acceptance. A printing ink vehicle composed of the rosin-modified phenolic resin, a solvent and/or a drying oil has superior quality, but suffers from the defect that because rosin is a naturally occurring material, its supply is unstable and its price is high. On the other hand, petroleum resins, which are obtained by polymerizing oils or cracked oil fractions obtained in great quantities as by-products of the petrochemical industry have the advantage that their supply and price are stable. The quality of the petroleum resins, however, is not satisfactory, and they scarcely have properties satisfactory for use as resin vehicles for printing inks.

It has previously been known that a hydrocarbon solvent-soluble resin is obtained by heat-polymerizing dicyclopentadiene at a high temperature of 250° to 350° C. in the presence of an inert hydrocarbon solvent (U.S. Pat. No. 3,084,147). The dicyclopentadiene resin so obtained has poor miscibility with various materials and poor tackiness because it does not contain a polar group, and therefore, is difficult to use effectively in various applications. An ink prepared by adding a solvent and a pigment to this resin has poor pigment dispersibility, and printed matter obtained by using this ink has a non-uniform printed surface with poor ink adhesion and poor gloss. Hence, it cannot be used as a resin vehicle for offset printing inks.

An attempt was made to produce a resin for printing inks by subjecting an acrylate ester, maleic anhydride, etc. to addition-reaction with the dicyclopentadiene resin, hydrolyzing the adduct, and reacting the resulting carboxylic acid-containing resin with a polyhydric alcohol and a higher unsaturated fatty acid (Japanese Laid-Open Patent Publication No. 24405/72). In the softening point of the base resin is increased in order to form the resulting resin into an offset printing ink having the set time and drying time similar to those of conventional inks, the solubility of the ink in petroleum-derived hydrocarbons will be poor, the flowability of the ink will be reduced, and the gloss of the ink applied will be extremely decreased. Furthermore, gellation and turbidity occur during the preparation of a varnish, and the color of the varnish is poor. Conversely, when it is desired to obtain good solubility in ink solvents, the softening point of the base resin should be decreased. As a result, the set time and drying time of the resulting ink become slow, and the ink is useless for practical application.

A resin obtained by copolymerizing cyclopentadiene and maleic anhydride under heat is known (U.S. Pat. No. 2,608,550). If the amount of the maleic anhydride is reduced, this resin has an inconveniently high softening point, and possesses poor miscibility with filler materials and poor pigment dispersibility. If the amount of maleic anhydride is increased in an attempt to remedy this defect, coloration and gellation tend to occur, and the resin also has poor weatherability.

It is further known that a resin for inks can be produced in accordance with a so-called alkyd recipe by using as a polybasic acid component a resin obtained by heat polymerization of dicyclopentadiene and maleic anhydride, and reacting it with a polyhydric alcohol and a drying oil (U.S. Pat. No. 2,608,550). The alkyd resin so produced generally has a high molecular weight, and poor solubility in drying oils and high-boiling hydrocarbon solvents for inks. An ink prepared by using this alkyd resin has poor flowability, and printed matter obtained by using this ink has poor gloss. Moreover, in the printing process, the ink scatters markedly from the roll in a mist form to smudge the paper (so-called misting). Such a resin is useless in practical application.

An objective of this invention is to provide a varnish composition for offset printing inks, which has the various properties required of an offset printing ink, and which is obtained from an inexpensive resin that can replace the rosin-modified phenolic resins and can be produced from raw materials obtained in great quantities at low cost in the petrochemical industry.

According to this invention, there is provided a novel varnish composition for offset inks, said composition comprising

[A] 100 parts by weight of a resin having a softening point of at least 100° C. and an acid value of 5 to 50, said resin being produced by reacting 100 parts by weight of (I) a hydrocarbon resin obtained by polymerizing (a) a 5-membered cyclic compound having a conjugated double bond and expressed by the following general formula

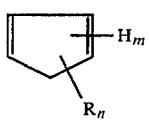

wherein H represents hydrogen, R represents an alkyl group having 1 to 3 carbon atoms, m and n are 0 or an integer of at least 1, and m+n=6, and/or its Diels-Alder adduct, with 1 to 15 parts by weight of (b) an unsaturated carboxylic acid and/or its anhydride to form (II) an acid-modified resin, reacting the acid-modified resin (II) with 0.1 to 1.0 molar equivalent based on the acid groups in the acid-modified resin (II), or 0.2 to 2.0 mole equivalents based on the acid anhydride groups in acid-modified resin (II), of (c) a saturated and/or unsaturated monohydric higher alcohol to form (III) an esterified resin, and further reacting 100 parts by weight of the esterified resin (III) with 5 to 100 parts by weight of (d) a phenolic resin desired from formaldehyde and a phenol having an alkyl substituent containing 4 to 9 carbon atoms,

[B] 50 to 200 parts by weight of a hydrocarbon solvent having an aromatic content of not more than 50% by weight and a boiling range of from 200° to 350° C., and

[C] 10 to 100 parts by weight of a drying oil.

Japanese Patent Publication No. 75/77 discloses a resin for gravure printing inks, which is obtained by modifying a hydrocarbon resin produced by the polymerization of a cycloaliphatic diene with a mixture having an olefinic polycarboxylic acid unit or unsaturated monocarboxylic acid unit, and esterifying the modified resin with at least one alcohol selected from monohydric and polyhydric alcohol, or further mixing and/or chemically binding another resin such as an acid-modified aromatic hydrocarbon resin, the colophonium-phenol reaction product and an alkylphenol-formaldehyde resin with the resulting product.

The present inventors made extensive investigations in order to achieve the aforesaid objective, and found that among known resins for gravure printing inks, those having a very much limited structure meet the aforesaid requirements for offset ink resin vehicles, and can be used very favorably as resin vehicles for offset printing inks. The present inventors have found for the first time that only a very much limited number of resins that can be used in gravure inks containing toluene as a solvent and not containing a drying oil exhibit superior properties in offset printing inks which contain a drying oil and a solvent having an aromatic content of not more than 50% by weight and having a far higher boiling point than toluene.

The invention is described in greater detail below.

The hydrocarbon resin (I) in this invention can be produced by homopolymerization or copolymerization of a 5-membered cyclic compound having a conjugated double bond expressed by the following formula

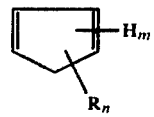

wherein H represents hydrogen, R represents an alkyl group having 1 to 3 carbon atoms, m and n are 0 or integers of at least 1, and m+n=6, and/or its Diels-Alder adduct [component (a)].

Specific examples of the 5-membered cyclic compound are cyclopentadiene and methylcyclopentadiene, and examples of its Diels-Alder adduct are dicyclopentadiene, a cyclopentadiene-methylcyclopentadiene codimer, tricyclopentadiene, and mixtures of these. These exemplified compounds can be used favorably in commercial practice. Cyclopentadiene, dicyclopentadiene and a mixture of these are especially preferred.

Cyclopentadiene, dicyclopentadiene, and the alkyl-substituted derivatives thereof need not have high enough purity. Preferably, however, the component (a) contains at least 80% by weight of cyclopentadiene, dicyclopentadiene or an alkyl-substituted derivative thereof. There can also be used a concentrated fraction obtained by heat-dimerizing cyclopentadiene and methylcyclopentadiene contained in a $C_5$ fraction in a by-product oil from high-temperature thermal cracking of naphtha, etc. to form a mixture comprising dicyclopentadiene, dimethylcyclopentadiene, a cyclopentadienemethylcyclopentadiene codimer, a cyclopentadiene-isoprene codimer, and a cyclopentadiene-piperylene codimer, and distilling the mixture to remove most of the $C_5$ components such as $C_5$ olefin and $C_5$ paraffin.

The hydrocarbon resin (I) can be obtained by simply heating the component (a) at 150° to 300° C., preferably 200° to 280° C., for 10 minutes to 20 hours, preferably 1 to 10 hours. The hydrocarbon resin (I) can also be obtained by reacting the component (a) in the presence of a Friedel-Crafts type Lewis acid catalyst at −30° C. to 100° C., preferably 0° to 50° C., for 10 minutes to 20 hours, preferably 1 to 10 hours.

In the production of the hydrocarbon resin (I), an unsaturated component, especially an unsaturated aromatic component, in petroleum fractions may be used conjointly in an amount equal to, or less than, the amount of the component (a). For example, styrene, alpha-methylstyrene, vinyltoluene, indene, methylindene and mixtures of these may be used, and for commercial operation, a $C_9$ fraction obtained as a by-product in the cracking of naphtha, etc. is preferred.

The hydrocarbon resin (I) obtained as above is then reacted with an unsaturated carboxylic acid and/or its anhydride [component (b)]. Preferably, the component (b) is an unsaturated mono- or poly-carboxylic acid having 3 to 32, preferably 4 to 20, carbon atoms or its anhydride. Typical examples of the component (b) are acrylic acid, methacrylic acid, maleic acid, maleic anhydride, tetrahydrophthalic acid, tetrahydrophthalic anhydride, fumaric acid, citraconic acid, itaconic acid, mixtures of these, and drying oil fatty acids such as linseed oil fatty acid. Of course, maleic acid and maleic anhydride are preferred.

The amount of the unsaturated carboxylic acid and/or its anhydride is 1 to 15 parts by weight, preferably 1 to 10 parts by weight, per 100 parts by weight of the hydrocarbon resin (I). If the amount of the unsaturated carboxylic acid and/or its anhydride is less than the lower limit specified above, the resulting resin contains a small amount of polar groups, and therefore, little exhibits the characteristic features of a resin having polar groups. When the resin is used as a vehicle for inks, pigment dispersibility, the flowability of the resulting ink, and the printing effect of the ink are undesirably degraded. On the other hand, if the amount of the component (b) exceeds the upper limit specified above, the amount of polar groups is too large, and the solubility of the resin in solvents becomes poor. Moreover, discoloration and gellation of the resin tend to occur undesirably. When it is used for inks, its solubility in a hydrocarbon solvent used in varnish preparation is poor, and the flowability of the ink and the gloss of printed matter are undesirably degraded.

Preferably, the acid-modifying reaction is carried out at a temperature of 100° to 300° C., preferably 150° to 250° C., in the absence of a catalyst or in the presence of a known radical initiator such as an organic peroxide for a period of 30 minutes to 15 hours, preferably 1 to 8 hours.

The acid-modified resin (II) of this invention can also be produced by a one-step process which comprises heat polymerizing the 5-membered cyclic compound having a conjugated double bond and/or its Diels-Alder adduct (a) in the presence of the unsaturated carboxylic acid and/or its anhydride (b) added to the reaction system from the start or at a certain point during the reaction.

The resulting acid-modified resin (II) is then esterified with a saturated and/or unsaturated higher monohydric alcohol having at least 6 carbon atoms [component (c)].

The component (c) may be any of monohydric alcohols having at least 6 carbon atoms which are produced commercially. For example, straight-chain or branched-chain alcohols such as heptanol, isodecanol and tridecanol or mixtures thereof which are synthesized by the oxo method, the Ziegler method, alcohols obtained by the reduction of coconut oil, oleyl alcohol from sperm oil, and mixtures of these can be used.

Use of lower alcohols having less than 6 carbon atoms is undesirable because the resulting resin has poor solubility in high-boiling hydrocarbon solvents for inks, and the properties of the resin for offset inks are degraded. The upper limit to the number of carbon atoms of such alcohols is not specifically set in this invention, but for commercial operation, those having not more than 22 carbon atoms are preferred. Saturated and/or unsaturated higher monohydric alcohols having 12 to 15 carbon atoms are most preferred in this invention.

If a polyhydric alcohol is used instead of the monohydric alcohol, the resulting resin has poor solubility in high-boiling solvents for inks, and a solvent-insoluble gel may form at the time of esterification. An ink prepared by using the resulting resin has poor flowability and gloss, and the resin is unsuitable for offset inks.

The amount of the component (c) used in the esterification reaction is 0.1 to 1.0 mole equivalent per mole equivalent of the carboxyl groups in the acid-modified resin (II), or 0.2 to 2.0 mole equivalents per mole equivalent of the acid anhydride groups in the acid-modified resin (II). If the amount of the component (c) is less than the lower limit specified above, the resulting resin has poor solubility in ink solvents and the resulting ink has poor properties as is the case with the acid-modified resin (II). On the other hand, if the amount of component (c) exceeds the upper limit specified above, the esterification reaction becomes difficult, and the softening point of the resin tends to decrease.

Preferably, the esterification reaction is carried out by adding the component (c) to heat-melted acid-modified resin (II) or a solution of the acid-modified resin (II) in a hydrocarbon solvent such as benzene, toluene or xylene, and reacting them at a temperature of, for example, 150° to 250° C., for 30 minutes to 10 hours, preferably 1 to 5 hours.

The reaction is carried out in a reactor adapted to be heated with stirring at atmospheric or elevated pressures. If desired, a device for removing by-product water during the reaction may also be set up. When the alcohol is used in an amount of not more than 1 mole per mole of the acid anhydride group in the acid-modified resin obtained by the addition-reaction of a dibasic acid anhydride, water is not formed as by-product during the esterification and therefore, the reaction easily proceeds. Thus, a water-removing device needs not to be installed in this case. When the esterification reaction is carried out in a solvent, the solvent may, if desired, be removed by distillation after the reaction.

The desired resin [A] can be obtained by reacting the resulting esterified resin (III) further with a phenolic resin [component (d)].

The phenolic resin used in this invention is obtained from a phenol having an alkyl substituent with 4 to 9 carbon atoms and formaldehyde. For commercial operation, p-tert-butylphenol, sec-butylphenol, p-tert-octylphenol, and nonylphenol are preferred as the phenol. Unsubstituted phenol and phenols having an alkyl substituent with less than 4 carbon atoms such as cresol are undesirable because the resulting modified phenolic resin has reduced solubility in high-boiling hydrocarbons, and such a phenolic resin degrades the emulsifying property of ink. A phenolic resin derived from a phenol having a substituent with at least 10 carbon atoms and formaldehyde is undesirable because the modified resin obtained has a markedly low softening point.

The amount of the phenolic resin used in modification is 5 to 100 parts by weight, preferably 10 to 50 parts by weight, per 100 parts by weight of the esterified resin (III). When the amount of the phenolic resin is less than the lower limit specified above, an ink prepared by using the resulting modified resin as a vehicle has insufficient flowability, and printed matter obtained by using the ink has insufficient gloss. If the amount of the phenolic resin exceeds the upper limit specified above, the resulting resin has poor solubility in solvents for inks, and such excessive amounts are economically disadvantageous in commercial practice.

The reaction proceeds sufficiently by mixing and melting the esterified resin (III) and a phenolic resin, and heating them at 150° to 250° C., for 30 minutes to 10 hours, preferably 1 to 7 yours. If desired, however, an acid catalyst such as oxalic acid and toluenesulfonic acid or a Friedel-Crafts type catalyst can be used.

The desired phenol resin-modified resin can also be obtained by reacting formaldehyde and the phenol in the presence of the esterified resin (III) in the absence or catalyst or in the presence of a catalyst such as oxalic acid or maleic acid.

The resulting resin [A] should have a softening point of at least 100° C., preferably at least 130° C. If the softening point of the resulting resin [A] is less than the lower limit specified above, a printing ink prepared from it frequently undergoes misting and the rate of its drying is extremely reduced. Moreover, blocking tends to occur.

Furthermore, the resulting resin [A] should have an acid value of 5 to 50, preferably 5 to 20. If the acid value of the resin is less than the lower limit specified above, an ink prepared from it has poor flowability. If the acid value exceeds the upper limit specified above, an offset printing ink prepared from it undesirably has reduced resistance to emulsification.

According to this invention, an ink varnish is prepared by dissolving 100 parts of the resulting modified resin [A] in 50 to 200 parts of a high-boiling hydrocarbon solvent [B] and 10 to 100 parts by weight of a drying oil [C] at an elevated temperature.

The high-boiling hydrocarbon solvent used in this invention has a boiling point of 200° to 350° C., preferably 250° to 330° C., and an aromatic content of not more than 50% by weight, preferably not more than 30% by weight. Any of drying oils usually known for use in offset printing inks. Specific examples include linseed oil, tung oil, and long oil-type alkyd resins.

The ink varnish so obtained is kneaded with a pigment, a dryer, a wax, etc. as required to afford an offset printing ink.

The following Examples illustrate the present invention specifically. It should be understood however that the invention is not limited to these specific examples.

SYNTHESIS EXAMPLE 1

A 500 ml. three-necked flask equipped with a stirrer and a thermometer was charged with 200 g of dicyclopentadiene (DCPD) having a purity of 97% and 100 g of toluene, and the contents were cooled to 0° C. To the mixture was added slowly 4 g of a boron trifluoride/phenol complex, and the reaction was carried out at 30° C. for 3 hours. After the reaction, the reaction mixture was neutralized with alkali and washed with water. The unreacted DCPD, products of low degrees of polymerization and toluene were removed by distillation to afford 133 g of a hydrocarbon resin (I-1) having a softening point of 129.5° C. and a bromine value of 81.2.

Eighty (80) grams of the resin (I-1) was melted by heating at 200° C., and with stirring, 4 g of maleic anhydride was added. They were reacted for 4 hours to afford an acid-modified resin (II-1) having a softening point of 149.0° C. and an acid value of 23.9. Subsequently, 3.1 g (0.42 mole per mole of the acid anhydride groups) of mixed oxo alcohol having 12 to 15 carbon atoms was added to 84 g of the acid-modified resin (II-1), and the resin (II-1) was esterified at 200° C. for 2 hours to form an esterified resin (III-1) having a softening point of 139.5° C. and an acid value of 20.1. Furthermore, 11.9 g of a resol-type phenolic resin obtained from p-tert-butylphenol and formaldehyde was added to 87.0 g of the esterified resin (III-1), and they were reacted at 190° C. for 3 hours to afford a resin (IV-1) having a softening point of 171.0° C. and an acid value of 19.1.

SYNTHESIS EXAMPLE 2

A mixture consisting of 150 g of DCPD having a purity of 97%, 109 g of an aromatic fraction having a boiling range of 140° to 280° C. formed by the thermal cracking of naphtha, and 41 g of toluene was cooled to 0° C. Then, 3.3 g of a boron trifluoride-phenol complex was slowly added, and the reaction was performed at 30° C. for 3 hours. After the reaction, the reaction mixture was neutralized with alkali, and washed with water. Distillation of the product afforded 147 g of a hydrocarbon resin (I-2) having a softening point of 132.0° C. and a bromine value of 60.8.

One hundred (100) grams of the resin (I-2) was melted by heating at 200° C., and then 3.5 g of maleic anhydride was added. With stirring, they were reacted for 4 hours to afford an acid-modified resin (II-2) having a softening point of 142.5° C. and an acid value of 17.2. Subsequently, 3.1 g (0.47 mole per mole of the acid anhydride groups) of oxo alcohols having 12 to 15 carbon atoms was added, and the resin was esterified at 200° C. for 2 hours to afford an esterified resin (III-2) having a softening point of 133.5° C. and an acid value of 16.1. To 100 g of the esterified resin (III-2) was added 14.5 g of a resol-type phenol resin obtained from p-tert-butyl phenol and formaldehyde, and they were reacted at 190° C. for 3 hours to afford a resin (IV-2) having a softening point of 165.0° C. and an acid value of 15.4.

SYNTHESIS EXAMPLE 3

To 87.1 g of the esterified resin (II-1) obtained in Synthesis Example 1 was added 15.4 g of a resol-type phenolic resin derived from p-tert-octylphenol and formaldehyde, and they were reacted at 190° C. for 3 hours to afford a resin (IV-3) having a softening point of 169.0° C. and an acid value of 19.8.

SYNTHESIS EXAMPLE 4

To 87.1 g of the esterified resin (III-2) obtained in Synthesis Example 2 was added 21.8 g of a resol-type phenol resin derived from nonylphenol and formaldehyde, and they were reacted at 190° C. for 4 hours to afford a resin (IV-4) having a softening point of 169.5° C. and an acid value of 19.6.

COMPARATIVE SYNTHESIS EXAMPLE 1

Eighty (80) grams of the hydrocarbon resin (I-1) obtained in Synthesis Example 1 was melted by heating at 200° C., and with stirring, 5.6 g of maleic anhydride was added. They were reacted for 5 hours to afford an acid-modified resin (II-1C) having a softening point of 156.5° C. and an acid value of 29.7. Subsequently, 3.5 g of oxo alcohol having 12 to 15 carbon atoms was added to 80 g of the acid-modified resin (II-1C), and the resin was esterified at 200° C. for 2 hours to form an esterified resin (III-1C) having a softening point of 152.0° C. and an acid value of 25.2.

COMPARATIVE SYNTHESIS EXAMPLE 2

Maleic anhydride (2.4 g) was added to 80 g of the hydrocarbon resin (I-2) obtained in Synthesis Example 2, and they were reacted at 200° C. for 4 hours to afford an acid-modified resin (II-2C) having a softening point of 137.0° C. and an acid value of 15.7. Subsequently, 11.2 g of a resol-type phenolic resin derived from p-tert-butylphenol and formaldehyde was added to 80 g of the acid-modified resin (II-2C), and they were reacted at 190° C. for 3 hours to afford a resin (IV-2C) having a softening point of 167.0° C. and an acid value of 15.9.

COMPARATIVE SYNTHESIS EXAMPLE 3

To 87.1 g of the esterified resin (III-2) obtained in Synthesis Example 2 was added 11.9 g of a resol-type phenolic resin obtained from phenol and formaldehyde, and they were reacted at 190° C. for 3 hours to afford a resin (IV-3C) having a softening point of 174.0° C. and an acid value of 18.8.

COMPARATIVE SYNTHESIS EXAMPLE 4

To 87.1 g of the esterified resin (III-1) obtained in Synthesis Example 1 was added 11.9 g of a resol-type phenolic resin obtained from cresol and formaldehyde, and they were reacted at 190° C. for 3 hours to afford a resin (IV-4C) having a softening point of 172.0° C. and an acid value of 19.0.

COMPARATIVE SYNTHESIS EXAMPLE 5

One hundred (100) grams of the hydrocarbon resin (I-1) obtained in Synthesis Example 1 was reacted with 8 g of maleic anhydride at 200° C. for 4 hours with stirring to form an acid-modified resin (II-2C) having an acid value of 41.0. To 100 g of the acid-modified resin (II-2C) was added 3.0 g (0.29 mole per gram equivalent of the acid anhydride groups) of trimethylolpropane, and they were reacted at 220° C. for 3 hours to afford an esterified resin (III-5C) having a softening point of 163° C. and an acid value of 37.0.

EXAMPLES 1 TO 4 AND COMPARATIVE EXAMPLES 1 TO 6

Varnishes were prepared in accordance with the following recipe using the resins obtained in Synthesis Examples 1 to 4 and Comparative Synthesis Examples 1 to 5 and a commercially available control resin (rosin-modified phenolic resin manufactured by Japan Reichhold Co., Ltd., and sold under the tradename Beccasite 1126HV ®. Inks were prepared by using these varnishes, and their properties were tested. The results are shown in Table 1.

PREPARATION OF VARNISH

Linseed oil (35 g) was added to 50 g of the resin, and the mixture was heated at 240° C. for 90 minutes. Then, 20 to 40 g of a petroleum-derived hydrocarbon solvent [Nisseki No. 5 solvent (*1)] was added and uniformly mixed to form a varnish.

PREPARATION OF INK

Using a three-roll mill, the following ingredients were kneaded.

| | |
|---|---|
| Carmine 6B (*2) | 14 g |
| Varnish | 50 g |
| Solvent (Nisseki No. 5 Solvent) | 5 g |
| Wax compound | 2 g |
| Dryer (cobalt naphthenate) | 0.3 g |

PERFORMANCE TESTS AND RESULTS (1) Gloss: The ink (0.4 cc) was extended on art paper using an RI tester (*3), and allowed to stand for 24 hours. Then, the gloss of the ink-extended surface was measured by a 60°—60° glossmeter.

(2) Set time: After extending 0.4 cc of the ink on art paper using the above-mentioned IR tester, another sheet of art paper was superimposed on the ink-extended surface of the art paper. Using an RI tester roller, the degree of adhesion of the ink to the superimposed art paper was observed with the passage of time, and the time that elapsed until there was no adhesion of the ink was measured.

(3) Misting: The ink (2.4 cc) was placed on an Inkometer (*4) and it was rotated for 3 minutes at a speed of 1,200 rpm. The degree of scattering of the ink to art paper placed under the roll was observed.

(4) Drying time: The ink (0.4 cc) was extended on art paper using the above-mentioned RI tester, and then the drying time was measured by an ink drying tester (*5).

(5) Emulsifying property of the ink: Water was added to the ink to emulsify it, and the flowability of ink after emulsification was measured. An offset printing ink contacts water during printing, and is partly emulsified. Accordingly, only those inks which have good flowability in the emulsified state are feasible for offset printing.

(*1): A solvent for inks having an aromatic content of 28% by weight and a boiling range of 276° to 311° C.; a product of Nippon Oil Co., Ltd.
(*2): A product of Toyo Ink Mfg., Co., Ltd.
(*3): A printability tester made by Akira Seisakusho Co., Ltd.
(*4): A product of Toyo Seiki Co., Ltd.
(*5): A product of Toyo Seiki Co., Ltd.

TABLE 1

| Example (Ex.) or Comparative Example (CEx.) | Type of the resin | Viscosity of the varnish (poises) | Gloss of the printed surface | Set time (min.) | Drying time (min.) | Misting | State of the varnish | Emulsifying property of the ink |
|---|---|---|---|---|---|---|---|---|
| Ex. 1 | IV-1 | 560 | 64 | 8 | 2.5 | No | Clear | Good |
| Ex. 2 | IV-2 | 532 | 65 | 7 | 2.0 | No | Clear | Good |
| Ex. 3 | IV-3 | 530 | 68 | 8 | 2.5 | No | Clear | Good |
| Ex. 4 | IV-4 | 580 | 68 | 9 | 2.5 | No | Clear | Good |
| CEx. 1 | III-1C | 510 | 50 | 12 | 4.0 | No | Clear | Poor |
| CEx. 2 | IV-2C | 520 | 50 | 11 | 3.5 | No | Turbid | Slightly poor |
| CEx. 3 | IV-3C | 600 | 48 | 10 | 3.0 | Yes | Turbid | Slightly poor |
| CEx. 4 | IV-4C | 540 | 51 | 10 | 3.0 | Yes | Turbid | Slightly poor |
| CEx. 5 | III-5C | Because of the poor solubility of the resin in the solvent, a varnish could not be prepared from it. | | | | | | |
| CEx. 6 | Control resin | 560 | 60 | 8 | 2.5 | No | Clear | Good |

As is shown in the above table, the resins used in Examples 1 to 4 had good solubility in the solvent, and therefore, the varnishes prepared were clear. With inks prepared from these varnishes, the gloss of the printed surface was especially good. Moreover, the inks prepared had superior emulsifying property, which is particularly important in offset printing inks.

As shown in Comparative Example 1, when a resin not modified with a phenolic resin was used, the emulsifying property of the ink was poor.

As shown in Comparative Example 2, a resin not subjected to esterification had insufficient solubility in the ink solvent, and the resulting varnish was turbid. The gloss of the printed surface and the emulsifying property of the ink were unsatisfactory.

In Comparative Examples 3 and 4, when unsubstituted phenol or a lower alkyl-substituted phenol such as methyl-substituted phenol was used as the phenol component of the phenolic resin to be used in modification, the resulting resin had insufficient solubility in the ink solvent. Accordingly, the resulting varnish was turbid, and the gloss of the printed surface and the emulsifying property of the ink were unsatisfactory.

As shown in Comparative Example 5, the resin obtained by modifying the acid-modified resin with a polyhydric alcohol (trimethylolpropane) had poor solubility in a high-boiling ink solvent (Nisseki No. 5 Solvent), and a uniform varnish could not be prepared.

What we claim is:

1. A varnish composition for offset printing inks, said composition comprising

[A] 100 parts by weight of a resin having a softening point of at least 100° C. and an acid value of 5 to 50, said resin being produced by reacting 100 parts by weight of (I) a hydrocarbon resin obtained by polymerizing (a) a 5-membered cyclic compound having a conjugated double bond and expressed by the following general formula

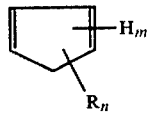

wherein H represents hydrogen, R represents an alkyl group having 1 to 3 carbon atoms, m and n are 0 or an integer of at least 1, and m+n equals 6, and/or its Diels-Alder adduct, with 1 to 15 parts by weight of (b) an unsaturated carboxylic acid and/or its anhydride to form (II) an acid-modified resin, reacting the acid-modified resin (II) with 0.1 to 1.0 molar equivalent based on the acid groups in the acid-modified resin (II), or 0.2 to 2.0 mole equivalents based on the acid anhydride groups in the acid modified resin (II), of (c) a saturated and/or unsaturated monohydric higher alcohol having at least 6 carbon atoms to form (III) an esterified resin, and further reacting 100 parts by weight of the esterified resin (III) with 5 to 100 parts by weight of (d) a phenolic resin derived from formaldehyde and a phenol having an alkyl substituent containing 4 to 9 carbon atoms,

[B] 50 to 200 parts by weight of a hydrocarbon solvent having an aromatic content of not more than 50% by weight and a boiling range of from 200° to 350° C., and

[C] 10 to 100 parts by weight of a drying oil.

2. The composition of claim 1 wherein said component (b) is selected from the group consisting of unsaturated mono- and poly-carboxylic acids having 3 to 32 carbon atoms and the anhydrides thereof.

3. The composition of claim 1 wherein the amount of said component (b) is 1 to 10 parts by weight per 100 parts by weight of the hydrocarbon resin (I).

4. The composition of claim 1 wherein the amount of said phenolic resin (d) is 10 to 50 parts by weight per 100 parts by weight of the esterified resin (III).

5. The composition of claim 1 wherein said resin [A] has a softening point of at least 130° C.

6. The composition of claim 1 wherein said resin [A] has an acid value of 5 to 20.

7. The composition of claim 1 wherein said hydrocarbon solvent [B] has a boiling range of from 250° to 330° C.

8. The composition of claim 1 wherein said hydrocarbon solvent [B] has an aromatic content of not more than 30% by weight.

* * * * *